2,859,616

APPARATUS FOR INDICATING THE RATE OF A FLOW OF A FLUID

Horace Fellows, Wolverhampton, England, assignor to H. M. Hobson Limited, London, England, a British company Application February 1, 1956, Serial No. 562,869

Claims priority, application Great Britain March 7, 1955

3 Claims. (Cl. 73—195)

This invention relates to flowmeters for measuring the rate of flow of liquid of the type comprising an electrical transmitter arranged to generate electrical pulses at a rate determined by the instantaneous rate of flow of liquid to be measured.

The present invention has for its object to provide a ratemeter for summing two or more instantaneous rates of fuel flow as indicated by a corresponding number of similar flowmeters of the above type.

The ratemeter according to the invention comprises a plurality of mono-stable flip-flops of the same time constant, one associated with each flowmeter, means for applying the pulses from each of the flowmeters to a control electrode of the normally non-conducting section of the associated flip-flop, and a device for measuring the current in an anode circuit common to the anodes of the normally non-conducting sections of all of the flip-flops.

One specific embodiment of summation device according to the invention will now be described in more detail, by way of example, with reference to the accompanying drawings in which.

Figure 3:
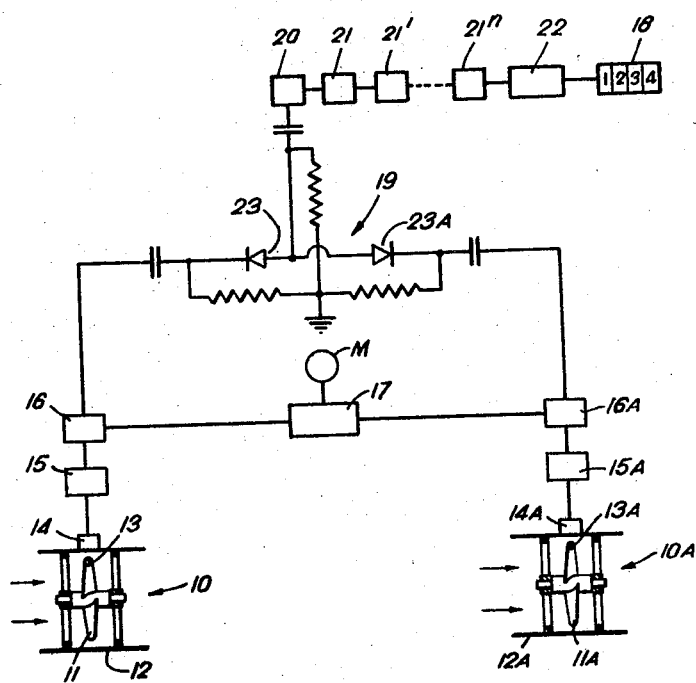
Fig. 3 is a block diagram showing two flowmeters, the common ratemeter and a common mechanism for summing on a counter the quantities of fuel or other liquid traversing the two flowmeters.

The two flowmeters 10, 10A shown in Fig. 3 are of similar construction, the transmitter of each producing the same number of pulses per unit quantity of liquid flowing. Parts of the flowmeter 10A bear the same reference numerals as the corresponding parts of the flowmeter 10, with the addition of the suffix A.

The flowmeter 10 comprises a vaned rotor 11 mounted for rotation within and about the axis of a conduit 12 through which liquid is flowing. The rotor 11 carries a magnet 13 which, as the rotor rotates, generates electrical pulses in a pick-up 14 external to the conduit 12. The pulses so generated are amplified by an amplifier 15 and converted by a shaper stage 16 into short pulses of the wave form indicated at $e_g 1$ in Fig. 1. The pulses from the two shaper stages 16, 16A are passed to a common ratemeter 17 of the construction shown in detail in Fig. 1.

Figure 1:
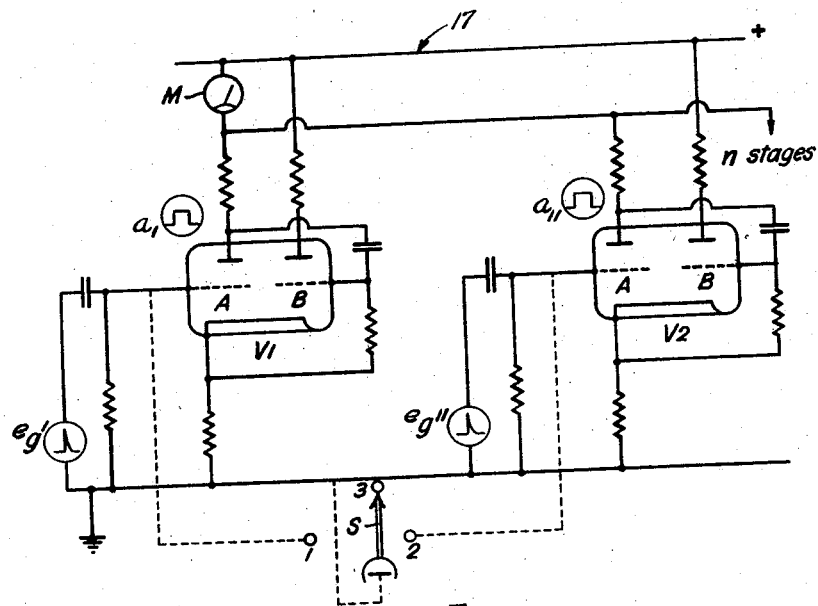
Fig. 1 is a circuit diagram of the ratemeter.

As indicated in Fig. 1, the ratemeter comprises two mono-stable flip-flops $V_1$, $V_2$ of the same time constant and each consisting of two triodes in a common envelope. The normally non-conducting section of each flip-flop is marked A and its normally conducting section is marked B.

Positive pulses $e_g 1$ of repetition rate $f_1$ are applied from the shaper stage 16 to the grid of the normally non-conducting section A of the flip-flop $V_1$, and positive pulses $e_g 11$ of repetition rate $f_2$ are applied from the other shaper stage 16A to the grid of the normally non-conducting section A of the flip-flop $V_2$. Each pulse applied to the grid of valve $V_1 A$ will produce at its anode $a_1$ a positive current pulse of amplitude $a_1$ max., and of width $t$, provided $T$, which equals $$\frac{1}{f_1}$$

secs., is greater than $t$, the mark time of the flip-flop. The unstable regime of the circuit has been so designed that over the working frequency range $T$ is always greater than $t$.

Similarly the pulses applied to the grid of valve $V_2 A$ produce at its anode $a_{11}$ pulses of amplitude $$a_{11} \text{ max.} = a_1 \text{ max.}$$

and width $t$.

An average reading milliammeter M, common to these two anode circuits, will record a current $Im$ which is the sum of the mean values $a_1$ av. and $a_{11}$ av. of the anode signal currents of the valves $V_1 A$ and $V_2 A$.

Figure 2:
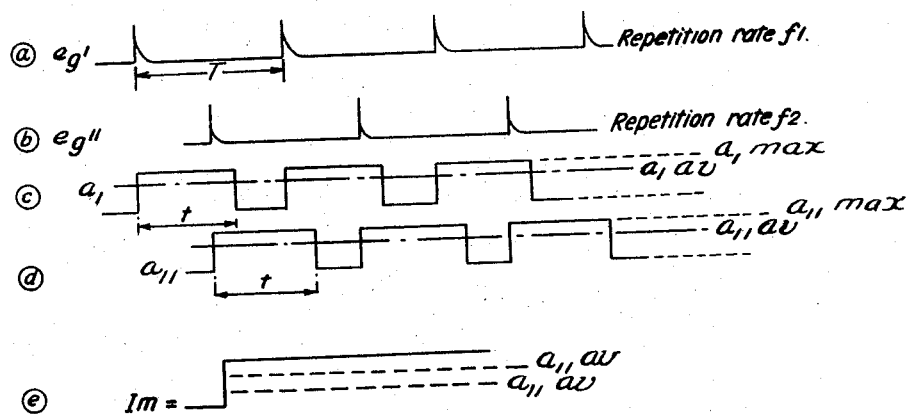
Fig. 2 shows diagrammatically the wave forms of certain pulses and the current measured by the current measuring device.

This is illustrated in Fig. 2, in which $a$ and $b$ respectively indicate the pulses applied to the grids of the valves $V_1 A$ and $V_2 A$, $c$ and $d$ respectively indicate the pulses appearing at their anodes and $e$ indicates the meter current $Im$.

$$a_1 \text{ av.} = f_1 a_1 \text{ max.}$$
$$a_{11} \text{ av.} = f_2 a_{11} \text{ max.}$$

and $$Im = a_1 \text{ av.} + a_{11} \text{ av.}$$

As will readily be understood, summation of more than two rates of flow may be achieved by adding the appropriate number of additional flip-flops, the pulses from their associated flowmeters being applied to the grids of their A sections and the meter M being connected in the common anode circuit of the A sections of all the flip-flops.

A three position selector switch S is provided. When this is on its central contact 3, as shown, the milliammeter M operates to sum the two instantaneous rates of flow as already described. If the switch S is moved to its contact 1, it grounds the input to the grid of valve $V_1 A$, so short-circuiting the flip-flop $V_1$ and causing the milliammeter M to record only the flow measured by the flowmeter associated with the flip-flop $V_2$. Similarly, movement of the switch S to its contact 2 short circuits the input to the flip-flop $V_2$ and the milliammeter then records only the flow measured by the flowmeter associated with the flip-flop $V_1$.

As indicated in Fig. 3, provision may also be made for summing on a counter 18 the quantities of liquid traversing the two flowmeters 10, 10A. To this end, the shaper stages 16, 16A are connected by a pulse gating circuit 19 and a buffer stage 20 to the first, 21, of a chain of $n$ electronic binary frequency dividers. The pulses from the last frequency divider $21^n$ actuate a driver stage 22 for the counter 18.

Each of the shaper stages 16, 16A is constituted by a mono-stable flip-flop and positive trigger pulses are supplied from the cathode resistor of this flip-flop to the ratemeter 17. Negative pulses are supplied from the anode of the normally conducting section of each shaper flip-flop to the pulse gating circuit 19, which includes the diodes 23, 23A which pass negative pulses, via the buffer stage 20, to the first binary frequency divider. The frequency dividers are flip-flops of the Eccles-Jordan type and the driver stage 22 comprises an amplifier having, in its anode circuit, a solenoid for actuating the counter.

The apparatus thus enables one counter 18 and one meter M to display the following:

(1) Fuel consumed and rate of fuel consumption of two aircraft engines.

(2) Fuel consumed and rate of fuel consumption of two aircraft reheat systems.

(3) Fuel consumed and rate of fuel consumption of one aircraft engine and one aircraft reheat system.

It will be appreciated that it is necessary, in order to permit of summation of rates of flow to a single ratemeter, that the two flowmeters 10, 10A should be similar, i. e. that they should perform equal numbers of revolutions per unit quantity of fuel flow through their respective conduits.

What I claim as my invention and desire to secure by Letters Patent is:

1. The combination, with a plurality of fluid flowmeters each comprising an electrical transmitter arranged to generate electrical pulses at a repetition frequency determined by the instantaneous rate of flow of fluid measured by said flowmeter, of a ratemeter common to all of said flowmeters, said ratemeter comprising a plurality of mono-stable flip flops one connected to each flowmeter, each flip-flop having a normally conducting section and a normally non-conducting section, both sections of each flip-flop having an anode and a control electrode and all of said flip-flops having the same time constant and a mark time less than the reciprocal of the repetition frequency of the pulses generated by any of said flowmeters, means for applying the pulses from each of the flowmeters to the control electrode of the normally non-conducting section of the associated flip-flop and a current measuring device connected in an anode circuit common to the normally non-conducting sections of all of the flip flops and responsive to the sum of the currents flowing in all of said normally non-conducting sections.

2. Apparatus as claimed in claim 1, wherein each flowmeter comprises a magnetized rotor mounted for rotation in a conduit for the passage of fluid, a co-operating coil external to the conduit, an amplifier for the pulses generated in the coil by the rotation of said rotor and a shaper stage for shaping the amplified pulses produced by the amplifier, the shaped pulses delivered by the shaper stages being applied to said control electrodes of the ratemeter flip-flops.

3. Apparatus as claimed in claim 2, comprising an electro-mechanical counter, a chain of binary electronic frequency dividers, and means for supplying pulses from all of the shaper stages to the first divider of the chain, the counter being actuated by the last divider of the chain.

References Cited in the file of this patent

UNITED STATES PATENTS

| | | |
|---|---|---|
| 1,614,217 | Thompson | Jan. 11, 1927 |
| 2,270,141 | Potter | Jan. 13, 1942 |
| 2,325,927 | Wilbur | Aug. 3, 1943 |
| 2,420,539 | Hornfeck | May 13, 1947 |
| 2,683,224 | Cole | July 6, 1954 |
| 2,724,270 | Trekell | Nov. 22, 1955 |

OTHER REFERENCES

Pages 414–420 "Active Networks" by Rideout, published 1954 by Prentice-Hall, New York.